United States Patent [19]
Cook et al.

[11] Patent Number: 5,339,654
[45] Date of Patent: Aug. 23, 1994

[54] HEAT TRANSFER APPARATUS

[75] Inventors: F. Bert Cook, Columbus; Stephen E. Petty, Dublin; Howard C. Meacham, Jr., Upper Arlington; Richard N. Christensen, Columbus; Kevin R. McGahey, Hilliard, all of Ohio

[73] Assignee: Columbia Gas System Service Corporation, Wilmington, Del.

[21] Appl. No.: 768,772

[22] Filed: Oct. 9, 1991

Related U.S. Application Data

[63] Continuation-in-part of Ser. No. 478,269, Feb. 9, 1990, Pat. No. 5,067,330.

[51] Int. Cl.5 .............................................. F25B 15/00
[52] U.S. Cl. ...................................... 62/476; 165/179; 165/184; 165/163
[58] Field of Search ................ 165/160, 163, 179, 184; 62/476

[56] References Cited

U.S. PATENT DOCUMENTS

| | | | |
|---|---|---|---|
| 4,313,491 | 2/1982 | Molitor | 165/163 |
| 4,316,501 | 2/1982 | Bowden et al. | 165/163 |
| 4,621,592 | 11/1986 | McInerney | 165/163 |
| 4,687,052 | 8/1987 | Fricker | 165/163 |

*Primary Examiner*—John M. Sollecto
*Attorney, Agent, or Firm*—Watkins, Dunbar & Pollick

[57] ABSTRACT

A refrigeration and heating system has been made in which improved efficiencies are obtained by placing helical concentric coils of at least two generators (80 and 81) and recuperators (86 and 95) on a common axis (232) with a heating unit (84) at the center and allowing the hot combustion gases (245) to circulate in serpentine fashion through separate concentric chambers containing the coils. Further efficiencies are obtained by placing an absorber (97), condenser (100) and recuperator (107) in a single module (270) and by using tube-in-tube or tube-in-cylinder construction with fluted inner tubes. A general purpose, divided-flow, tube-in-cylinder, heat-transfer device (400) is used to reduce the pressure drop in the circulating fluid.

20 Claims, 7 Drawing Sheets

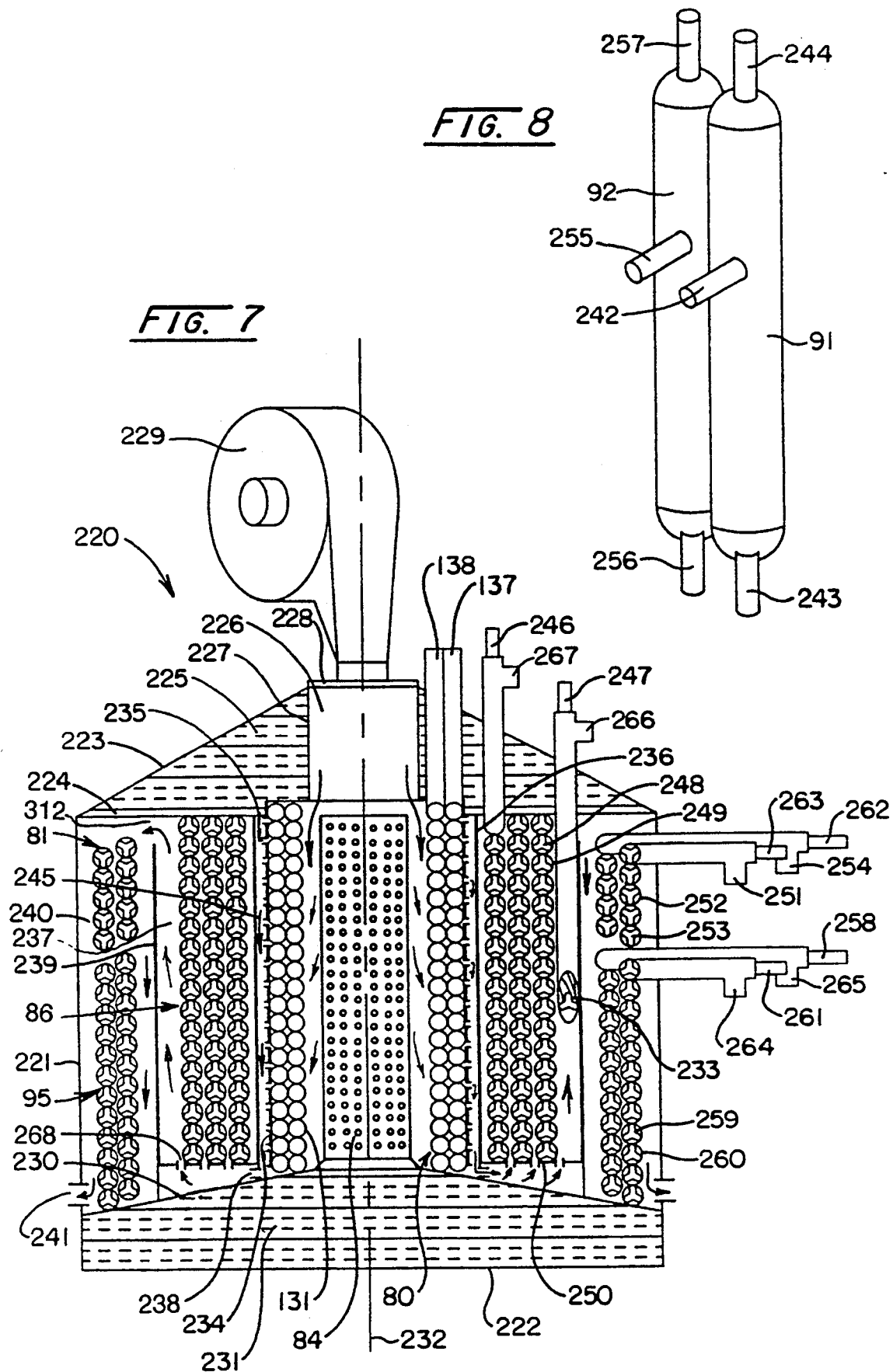

HEAT TRANSFER APPARATUS

This is the national stage of the Patent Cooperation Treaty application number PCT/US91/00914 filed Feb. 8, 1991 and published as WO 91/12472 on Aug. 22, 1991 and a continuation-in-part of U.S. application No. 07/478,269 filed Feb. 9, 1990 and issued as U.S. Pat. No. 5,067,330 all of which are incorporated by reference as if each were completely written herein.

FIELD OF THE INVENTION

This invention relates to a cooling and heating system which operates on the absorption and phase change heat exchange principle. More particularly it relates to a continuous heat actuated, air cooled, multiple effect generator cycle, absorption system.

In further aspects, this invention relates to improvements to the system constructed for use with an absorption refrigeration solution pair comprising a nonvolatile absorbent and a highly volatile refrigerant which is highly soluble in the absorbent. A disclosed refrigerant pair is ammonia as the refrigerant and sodium thiocyanate as the absorbent.

BACKGROUND OF THE INVENTION

The background of this invention is found in U.S. Pat. No. 4,646,541 (hereinafter the Prior Patent) which discloses the general subject matter of this invention. This invention therefore should be considered with reference to this Prior Patent which includes the common inventors F. Bert Cook and Edward A. Reid, Jr. and is assigned to the same assignee as this invention.

U.S. Pat. Nos. 4,742,693, 4,719,767, 4,691,532, 4,742,687, and 4,722,193 are sibling patents of the Prior Patent and are pertinent to the disclosure of this invention providing further background information on this subject matter.

In the quest for improvement in Absorption Refrigeration and Heat Pump Systems, the common measure of performance is the often referred to "coefficient of performance", i.e., COP. As used herein, coefficient of performance, i.e, COP, is defined as the energy transferred at the load in a unit of time divided by the energy provided to the system in the same unit of time which is well understood by those skilled in the art. Other measures of performance include reduction in complexity; or stated conversely, apparatus and system simplification.

Absorption systems are usually very efficient during the heating cycle, when a source of heat, such as a natural gas flame is used. On the other hand, these systems are less efficient in the cooling cycle.

Air cooled refrigeration circuits of the mechanical vapor compression type have also been demonstrated which can be reversed to provide either heating or cooling to a load by switching the flow of an intermediate heat transfer solution typically consisting of water and antifreeze solutions such as ethylene glycol, etc.

Liquid cooled absorption refrigeration circuits using the double effect generator cycle to achieve high efficiency are commercially available. However, these systems using water as the refrigerant are not suitable for use in heating a conditioned space (the heating load) since the refrigerant freezes at 32° F. and therefore cannot be used in a space heating system at ambient outside temperatures below approximately 40° F.

Absorption refrigeration and heat pump systems are well known in their basic operating characteristics and need little further description except to establish the definitions and context in which this invention will be later described.

In a typical system a refrigerant, water or other phase change material is dissolved in an absorbent (typically lithium bromide or other salts) and these are often called the "solution pair". The refrigerant is absorbed or desorbed (expelled) in or out of solution with the absorbent to varying degrees throughout the system and the heat of absorption is added or extracted to produce heating and cooling effects.

The solution pair enters a generator where it is subjected to heat and the applied heat desorbs (expels) a portion of the refrigerant in the form of a vapor which is conveyed to the condenser. There, external cooling condenses the refrigerant vapor to liquid, which is conveyed through an expansion valve, into an evaporator where heat is gained. In the refrigeration system operation the heat gained in the evaporator is from the cooling load.

The low pressure vapor then passes to an absorber where cooling allows the absorbent solution to absorb the refrigerant vapor. The solution is then conveyed to a recuperator by a pump. The recuperator is a counterflow heat exchanger where heat from the absorbent/refrigerant solution flowing from the generator to the absorber, heats the returning solution pair flowing from the absorber to the generator. In the heating cycle, the cooling applied at the absorber and/or the condenser is the heat delivered to the heating load.

As a matter of convenience and terminology herein, each part of the absorption system which operates at the same pressure is termed a chamber.

Conventional absorption refrigeration/heating systems are two chamber systems although three chamber systems appear in the prior art and have seen limited use. When operated as heat pumps, two chamber systems give respectable heating performance but give poor cooling performance.

Using ammonia ($NH_3$) as the refrigerant and water ($H_2O$) as the sorbent, heat pumping can occur from an ambient air source which is at temperatures below freezing. Where the air is treated as if it were dry so that no defrosting is necessary, the typical two chamber $NH_3/H_2O$ heat pump would represent a significant improvement over what would be expected of a simple furnace. However, since heat pumps are more expensive than furnaces, cooling season performance benefits are needed to justify the added expense. In other words, the heat pump must act as an air conditioner also to offset the additional cost of the heat pump combined with separate installation of an air conditioner with a furnace.

For cooling, an $NH_3/H_2O$ system is predicted to have a COP equal to about 0.5. This low performance index causes unreasonable fuel (or energy) costs from excessive fuel (or energy) use.

Three-chamber systems of various types have been suggested which would improve the performance by staging the desorption process into effects. This allows for increasing the actual temperature at which the driving heat is added to the system (cycle). Until the invention of U.S. Pat. No. 4,646,541 it was thought that this increase in temperature would represent an unreasonably high pressure, especially from ammonia/water systems, and would force the system to operate in regions for which data is not readily available.

In addition the pressure has tended to rule out ammonia/water in a three-chamber system. The search for organic materials such as halogenated hydrocarbons and other refrigerants as a replacement for the ammonia has been limited by fluid stability at these higher temperatures. Normal organic refrigerant stability tests have indicated that it is necessary for oil to be present for operation in vapor compression refrigeration systems. These high operating temperatures rule out most of the common refrigerants, particularly from being heated directly by combustion products which often cause local hot spots, which result in working fluid degradation and/or corrosion of components.

The heat actuated, air cooled, double effect generator cycle absorption refrigeration system of Prior Patent (U.S. Pat. No. 4,646,541) and the sibling patents therefrom overcome limitations of the existing prior art technology. The air cooled system therein eliminated the need for cooling water and the use of ammonia as the refrigerant avoids refrigerant freezing during heating operation. The double effect generator cycle permits high efficiency through internal heat recovery in the absorption refrigeration circuit. The use of sodium thiocyanate as the absorbent eliminates the need for analyzers and rectifiers to purify the refrigerant stream with the resultant loss of unrecoverable heat.

This invention is directed to further improvements and simplifications of the above described prior patented system. It applies to an integrated three-chamber system having one solution pair using a material of unusual fluid stability at higher temperatures when manipulated in an apparatus and system to take advantage of its properties. The typical preferred solution pair for operation as part of the system and components of this invention is ammonia as the refrigerant and sodium thiocyanate as the absorbent.

SUMMARY OF THE DISCLOSURE

By operating a multiple effect absorption refrigeration and/or heating system in a continuous fashion and using a switchable working fluid to effect heat transfer among the load, ambient outside air, and the outside heat exchanger depending on whether the system is operating in a heating, cooling, or defrosting mode, it is possible to obtain design improvement in the components and modules of the system that enable superior heating and cooling efficiencies.

To effect maximum heat transfer among the generators, recuperators, and external heat source, the following generator module design is used. The module is generally cylindrical in shape with the external heat source placed on the center axis of the module. A first generator means that is made of a plurality of finned coils with the coils juxtaposed one to the next in a generally annular composite form radially surrounds the external heat source. A first recuperator means having a plurality of solid exterior coils juxtaposed in contact one to the next in a generally annular composite form radially surrounds the first generator means. A second generator means and a second recuperator means, both comprising a plurality of solid exterior coils juxtaposed in contact one to the next surround the first recuperator. Preferably, the second generator coils surround a first portion of the first recuperator means and the second recuperator coils surround a second portion of the first recuperator means.

Generally, the coils of the various components are constructed in the general form of a cylindrical helix. Both the first and second recuperator coils and the second generator coil are of a construction designated as "tube-in-tube" construction. In such construction, one fluid flows within an inner tube while a second fluid flows in counterflow to the first fluid in an outer tube surrounding the inner tube.

To further improve operating efficiencies, the inner tube can be a fluted tube. A fluted tube is a tube with twisted longitudinal flutes (depressions or troughs) on the outside of the tubing giving rise to adjacent helical ridges (crests) and depressions (troughs) in both the exterior and interior tubing wall thereby effecting better heat transfer between the fluid within the tube and the fluid flowing on the outside of the tube.

To further improve the efficiency of the generator module, the module is divided into three concentric cylindrical chambers. The first chamber contains the heat source at its center and is surrounded by the first generator finned coils, that are formed in a generally annular composite form with the finned coils juxtaposed one to the next. In the second cylindrical chamber, which surrounds the first cylindrical chamber, is found a recuperator means having a plurality of juxtaposed contacting solid exterior coils which are in a generally annular composite form and which confirm to the annular shape of the chamber. A third cylindrical chamber surrounds the second chamber and contains a second generator and a second recuperator, both of which are constructed as a plurality of juxtaposed contacting solid coils that form a generally annular composite and which conform to the annular shape of the chamber. Generally, the coils of all of the components and the heat source share a common axis. A means for circulating the air and heat source combustion products (flue gas) through the various chambers consists of a blower located at one end of the first chamber and a series of apertures at the other end of the first chamber leading into the second chamber and yet another set of apertures at the other end of the second chamber leading into the third chamber and still yet another set of apertures leading from the third chamber to the exterior of the module so as to allow air from the blower and flue gas to circulate through the three chambers in a generally serpentine fashion, that is, from one end of the first chamber to the other end of that chamber and then into the second chamber, from one end of the second chamber to the other end of the second chamber and then into the third chamber, from one end of the third chamber to the other end of the third chamber, finally exiting through that end of the third chamber. Thus, the chambers have apertures at alternate ends of each successive chamber wall so as to provide serpentine circulation of heat source combustion products through the generator module.

By stacking the individual coils of the first and second recuperators and the second generator in tight contact, one to the next, and arranging the second generator and second recuperator so that they are stacked one on top of the other with coils of equal radii, the flue gas flows primarily through the large passages along side of the coils rather than between individual coils. By using large passageways along the coils rather than through and among them, clogging of small passages between the coils due to the accumulation of soot and dirt is avoided. Such an arrangement is particularly advantageous in that it not only avoids premature failure of the generator module but it also allows for the generator module components to be assembled in the same overall volume as the prior art arrangement. To achieve maximum heating of the first generator, the coils of the first generator have fine fins that allow the circulation of hot flue gas among and around the individual coils of the first generator tube.

By using a continuously operating absorption system with a switchable hydronic working fluid, it is possible to obtain certain efficiencies in the various components of the system, especially in the absorber and condenser. Thus, the absorption heat, i.e., liberated heat of absorption, can continuously be transferred to the hydronic working fluid. The heat transfer is accomplished in either a tube-in-tube or tube-in-cylinder absorber. Preferably, the absorption of the refrigerant vapor by the weak solution takes place in the inner tube of a tube-in-tube assembly or in the tube of the tube-in-cylinder assembly. To obtain even greater heat transfer between the absorber and the working fluid, a fluted tube is used in either the tube-in-tube or tube-in-cylinder assemblies. Similar considerations also apply to the condenser which transfers the condensation heat, i.e., the liberated heat of condensation resulting from the condensation of refrigerant, to the hydronic working fluid. Such design considerations are especially effective in a multiple effect absorption refrigeration system using ammonia as the refrigerant and sodium thiocyanate as the absorbent.

Ambient air heat losses are minimized by combining the absorber, condenser, and tertiary recuperator into one module. Preferably, the condenser and absorber are of the previously described tube-in-cylinder construction while the tertiary recuperator is of tube-in-tube construction. While this arrangement is preferred, it is to be understood that the various components of the condenser-absorber module could be of either tube-in-tube or tube-in-cylinder construction and that for the purposes of this invention, various combinations and permutations are considered to be equivalent.

Generally, the condenser-absorption module is contained in a cylindrical housing. The condenser axis is in common with the axis of the housing. The absorber and tertiary recuperator also are in common with the housing axis. The absorber and tertiary recuperator surround a first and second portion of the condenser. Preferably, the space between the various components and the module housing is filled with suitable insulating material. As a further improvement, a purge pot may be placed in the center space formed by the coils of the condenser.

Certain additional efficiencies can be obtained in the design of the fluted tubes for the various components. Preferably the evaporator and the condenser have four flutes while the other components including the recuperators, generators and absorber have three flutes. In addition, the evaporator and condenser are twisted more tightly so that they contain about three times as many flutes per unit length as the other components.

The foregoing and other advantages of the invention will become apparent from the following disclosure in which a preferred embodiment of the invention is described in detail and illustrated in the accompanying drawings. It is contemplated that variations and structural features and arrangement of parts may appear to the person skilled in the art, without departing from the scope or sacrificing any of the advantages of the invention which are delineated in the included claims.

BRIEF DESCRIPTION OF THE DRAWINGS

FIG. 7 is a cross-sectional elevational view of the generator/recuperator module of this invention taken on the vertical longitudinal axis 7—7 of FIG. 5.

FIG. 8 is a elevational perspective view of the separator components of this invention.

DETAILED DESCRIPTION OF A BEST MODE OF PREFERRED PRACTICE OF THE INVENTION

Figure 1:
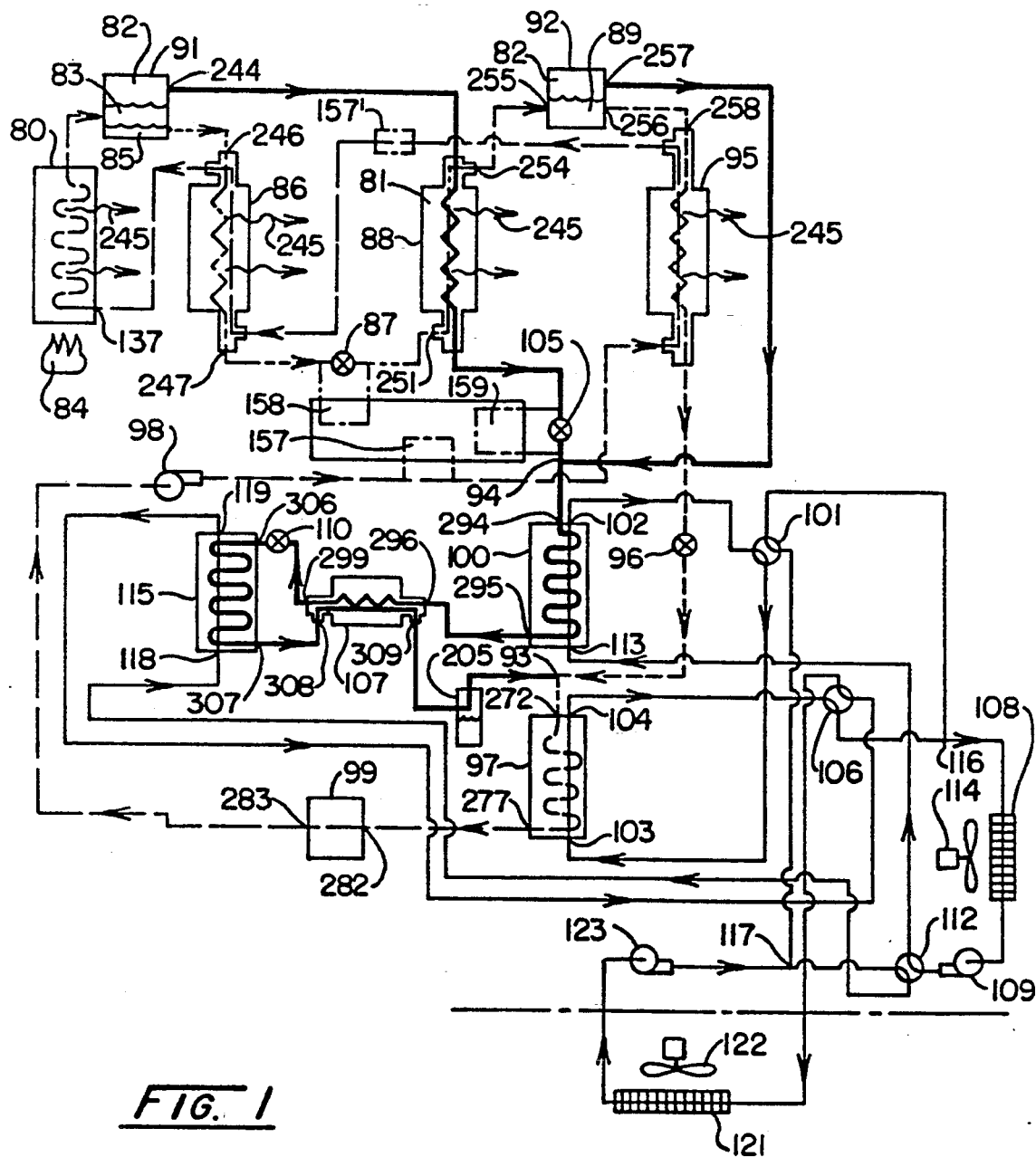
FIG. 1 is a diagram of the double effect absorption system of this invention in the cooling mode.

In the description of this invention, it is important that there is a clear understanding of the meanings of the terms used herein. Otherwise, because of the complexity of the entire system and the use of components from various fields of mechanical, chemical, and electrical arts, the terminology could be confusing in some cases.

Therefore, as used herein the term "strong solution", when speaking of the solution pair refers to that solution that has picked up refrigerant in the absorber and is in progress toward the generator and carries a higher ratio of refrigerant to absorbent than solution which has been desorbed and partially expelled of refrigerant in the generator(s) of the system. Solution from which refrigerant has been expelled is, by contrast, a "weak" or weaker solution holding a lesser ratio of refrigerant to absorbent in solution.

In the three chamber system of this invention, a solution of "intermediate" strength is employed between the generator means. This solution is by definition, weaker than strong solution and stronger than weak solution.

The terms "generator" and "desorber" are synonymous. The term "heat exchanger" defines apparatus where fluids are passed in close proximity to each other separated only by a usually impervious wall through which the heat from the warmer is conducted to the cooler. Conventionally, it is understood that heat passes from the hot fluid to the cold fluid.

As used herein, the term "heat exchanger" defines an apparatus which exchanges heat into or out of the system; i.e., with an external fluid such as ambient outdoor air, or ground water, or working fluid. Those apparatus which exchange heat within the system are termed "recuperators".

As further used herein, the term "working fluid" defines the fluid used to transfer heat to or from the load or heat sink. Preferably this is an ethylene glycol and water solution which is capable of remaining an unfrozen liquid at temperatures colder than liquid water alone. However, other working fluids such as calcium chloride and water could also be used.

As described in the Background Of The Invention portion of this disclosure, a double effect generator absorption system in which the thermo/physical properties are enhanced by the application of a sodium thiocyanate/ammonia absorbent/refrigeration pair, with generator and heat exchanger in a stacked coil configuration including tube-in-tube concepts, together with the combination of energy recovery motors to contribute to the power requirement of the solution pump required and found in absorption refrigeration systems, form the basis for the improvements to be further described below. Although sodium thiocyanate/ammonia are the preferred absorbent/refrigerant pair, other absorbents and refrigerants can be used including methyl or ethyl amine as the refrigerant and alkali metal nitrates or thiocyanates as the absorbent.

While the invention therein is a quantum leap forward in the application of methods and the construction of apparatus of heat driven absorption refrigeration and heat pump systems, and in particularly through the selection of the solution pair "ammonia as the refrigerant and sodium thiocyanate as the sorbent", it has been found that various improvements will be made with the methods and apparatus of this invention.

Double Effect Generator Absorption System with Switching Between Cooling, Heating, and Defrosting An absorption heat pump conceived to provide both space heating and space cooling must be able to be reversed between the heating and the cooling modes without adversely effecting the operation of the absorption refrigeration cycle. It is conceived in this invention that the double effect absorption heat pump shall remain operating in the same manner and in the same apparatus components for both the heating and cooling modes of operation. This method and apparatus of operation is uniquely conceived in connection with the application of surprisingly effective heat transfer components and methods provided in an improved generator/recuperator apparatus and in an improved condenser/absorber combination to be further described in detail as follows.

The arrangement of working fluid switching valves and control components are contributing features in the invention.

Referring to FIG. 1 a first generator means 80 feeds a heated strong solution 83 to a first separator 91. In the first generator means 80 and the separator 91, a vapor refrigerant 82 is desorbed and separated by the application of heat from a source 84, such as a gas flame.

A preferred construction of the first generator means 80 is shown in FIG. 7.

A solution of intermediate strength 85 remains in separator 91 and is conveyed to a first recuperator means 86 and then through a throttling valve or energy recovery motor 87 to a second generator means 81. Heat from the refrigerant vapor 82 is exchanged with the intermediate solution 85 in the second generator 81. Additional vapor 82 is desorbed from the intermediate solution 85 leaving a weak solution 89 in a second separator 92.

The weak solution 89 passes through a second recuperator 95 and a throttling valve 96 with a connection at 93, and into an absorber means 97. The weak solution 89 absorbs vaporous refrigerant 82 becoming a strong solution 83 which is pumped by a solution pump 98 successively through recuperators 95 and 86 back to the first generator means 80.

Liquid refrigerant 82 is conveyed from the second generator 81 through an energy recovery motor or expansion valve 105, and through a condenser 100 by way of a connection 94. Additional refrigerant vapor 82 from separator 92 is conveyed to the condenser 100 through the connection 94.

From the condenser 100 liquid refrigerant 82 is conveyed through a third recuperator 107, to an evaporator 115, by way of an expansion valve 110.

Cool low pressure refrigerant is returned from the evaporator 115 through the recuperator 107, exchanging heat with the warm liquid refrigerant 82, and passing to an accumulator 205.

In the accumulator 205, excess refrigerant 82 is collected which may have occurred as a result of changes in the amount of refrigerant contained in the condenser 100 and evaporator 115 because of their operation at different conditions, especially differences between cooling, heating, and defrost modes of operation. By this arrangement, the system refrigerant concentration may ideally be controlled between about 46% and about 32%.

From the accumulator 205 refrigerant joins the weak solution 89 at the connection 93. From the connection 93 the combined weak solution and refrigerant pass through the absorber 97 to a purge pot 99 thence to the inlet of a solution pump 98. By this process weak solution 89 absorbs vaporous refrigerant 82 becoming a strong solution 83 in the absorber 97, and is pumped by a solution pump 98 back to the first generator means 80, passing successively through recuperators 95 and 86.

This improvement invention includes a separate hydronic subsystem through which a working fluid is conveyed among the various components of the double effect absorption refrigeration system, and between the load and heat source or sink.

Referring again to FIG. 1, the subsystem is depicted as a single fine line, which is connected to the inlet 113 of the condenser 100 of the condenser 100 and passes through to a first four-way fluid valve 101 which is set to continue the flow to the inlet 103 of the absorber 97. After passing through the absorber 97, the fluid is conveyed from an outlet 104 to a second four-way valve 106, and fed to an inlet of a first outdoor heat exchanger 108. From the first heat exchanger 108 the working fluid is conveyed through a pump 109 to a third four-way valve 112 which has been positioned to return the working fluid to an inlet 113 of the condenser 100. By means of these connections, the heat of condensation and absorption of the hot refrigerant 82 is exchanged to the working fluid in the condenser 100 and absorber 97 which transfer the heat through the working fluid to the ambient outside air by heat exchange in the first heat exchanger 108. A fan 114 induces air flow across the first heat exchanger 108 increasing the rate of heat exchange to the outside ambient air.

In this cooling mode operation, the outlet 104 of the absorber 97 is connected from a joinder 116 through the first four-way valve 101 to the inlet 118 of the evaporator 115 at a joinder 117. No flow takes place between the joinders 116 and 117 in this mode, because there is no differential pressure in the working fluid between these two points and there is no return path. Therefore, flow cannot occur.

In this mode of operation, the working fluid is conveyed from an inlet 118 through the evaporator 115 to an outlet 119. From the outlet 119 of the evaporator 115, the working fluid is conveyed to four-way valve 106 and thence to the indoor second heat exchanger 121 where air from the conditioned space passes in heat exchange relationship with the working fluid. A fan 122 induces air flow across the coils of heat exchanger 121.

From the indoor heat exchanger 121, the working fluid is conveyed by a pump 123 past the joinder 117 and through the third valve 112 to the inlet 118 of the evaporator 115.

In this mode of operation the working fluid is cooled as it passes in heat exchange relationship with the cooled refrigerant in the evaporator 115. The cooled working fluid transfers this cooling to the indoor conditioned air in the second indoor heat exchanger 121.

Figure 2:
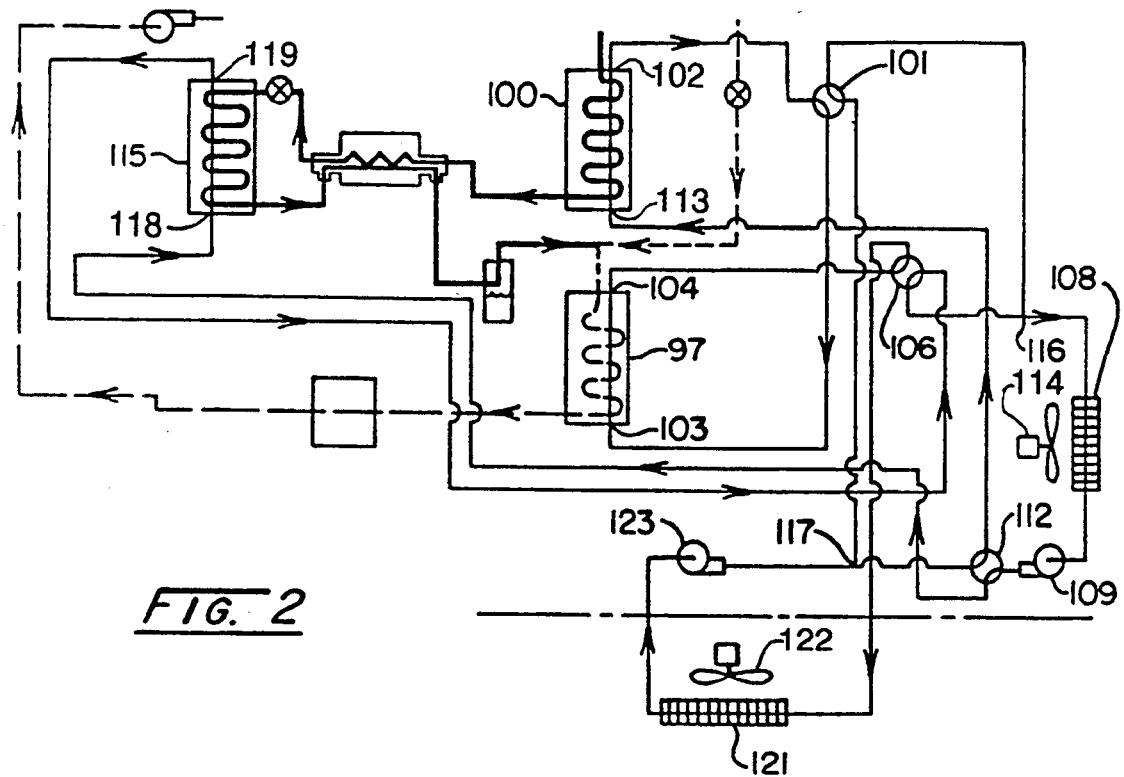
FIG. 2 is a diagram of the hydronic working fluid subsystem of the double effect absorption system of this invention in the heating mode.

Referring to FIG. 2, the double effect generator absorption system and operation remains the same for the heat pumping mode. However in this heating mode, the working fluid subsystem is switched by means of changes in the position of four-way valves 106 and 112. The four-way valve 101 remains in the previous position as shown for the cooling mode of FIG. 1.

In this arrangement the hot working fluid from the condenser 100 is conveyed through outlet 102 and four-way valve 101 to the inlet 103 of the absorber 97. The subsystem provides cooling to the absorber because the combined refrigerant and weak solution are at higher temperature, so that the necessary absorption process takes place in the absorption refrigeration system. The working fluid is heated further thereby and leaves the absorber 97 by way of outlet 104 to the four-way valve 106 which is reversed from the previous cooling mode of operation. The working fluid now passes to the second heat exchanger 121 where it exchanges heat with the conditioned air of the living space (the load). The fluid then first passes through the pump 123 and then through valve 112.

In this normal heating mode position of the four-way valves 106 and 112, the working fluid is conveyed from the evaporator 115 through the outdoor heat exchanger 108 where it receives heat from the outdoor air before returning to the evaporator inlet 118. The fan 114 may be operated intermittently depending on the outdoor air temperature and humidity conditions to reduce frost build up on the heat exchange surfaces. When the subsystem valves 106 and 112 are operating in this position, heat pumping occurs from the outside air to the evaporator raising the temperature of operation of the subsystem providing for a theoretical COP of higher than 1.0.

It will be seen that in comparison to the system described in the Prior Patent, simplification and important reductions in first costs and operating reliability have been achieved.

When the system is operating in the heating mode the first outdoor heat exchanger 108 is in communication with the evaporator and is absorbing heat from the surrounding outside ambient air environment. Under certain conditions of outside temperature and humidity the exterior surface of heat exchanger 108 will accumulate frost from the moisture in the surrounding atmosphere. An accumulation of frost on the surfaces of the outdoor heat exchanger 108 reduces its heat exchange efficiency hindering heat pumping operation and reducing the overall system performance. Various solutions have been proposed and are used in prior practices to overcome this problem, such prior systems are inconvenient and draw down the COP of the unit by the requirement of additional heat energy, such as by electrical resistance or the requirement for an auxiliary boiler.

However, in the operation of the system of this invention, defrosting is accomplished when four-way valves 112 and 101 are reversed and four-way valve 106 remains as positioned for the heating mode. Air flow across the first heat exchanger 108 is interrupted by shutting off the fan 114. The warm working fluid from the condenser is directed through the heat exchanger 108 melting the frost. Heat from the absorber continues to be directed through the second indoor heat exchanger 121 providing heat to the conditioned space although temporarily at a reduced rate for a short time. It is a feature of this invention that heat continues to flow to the load from the absorber 97 during the defrost cycle. In the conventional arrangements that have been provided to answer the frosting problem of air transfer heat pumps, it is a practice to cut off the heat pump completely and use electrical resistance heaters to provide heating during defrosting. This invention to the contrary, maintains heat flow from the heat pump during defrosting and in most circumstances, defrosting can be completed before heat is required in excess of that available during defrost operation. At the end of the defrost cycle, all the working fluid reversing valves are returned to their normal heating mode position, and the air flow over the first heat exchanger 108 is restored. Conventional controls are provided to sense the loss of efficiency resulting from frost build-up and the defrost cycle is operated automatically.

As an alternative, the working fluid from the absorber 97 may be passed through a heat exchanger relationship with a storage tank for domestic hot water when all the heat of the absorber means is not needed at the load, for instance when the outside ambient air is not cold or the system is operating in the cooling mode.

Figure 13:
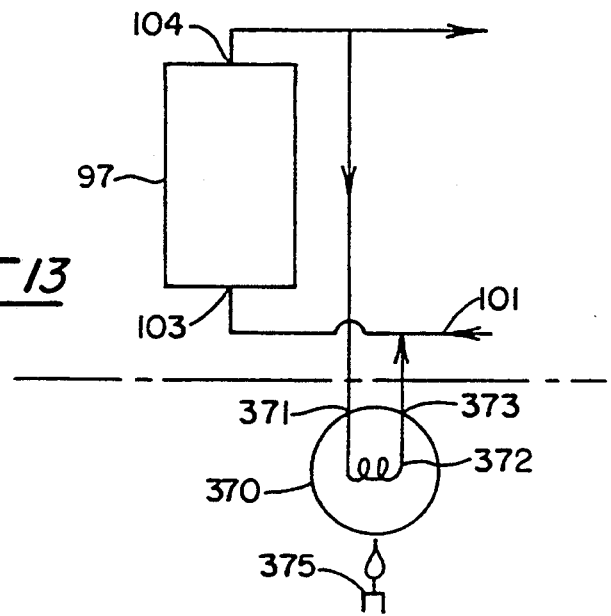
FIG. 13 is a schematic view of an alternative addition to the system of this invention for the purpose of providing domestic hot water.

As shown in FIG. 13, a domestic hot water heater and tank 370 is located within the residence to which the heat pump system of this invention is installed. The outlet 104 of the absorber 97 is connected to an inlet 371 of a heat exchange coil 372 in the hot water heater 370. An outlet of coil 372 is connected to the inlet of the absorber 97. A second source of heat 375 such as a gas burner is also provided to the hot water tank 370.

This domestic hot water heating subsystem is included in combination to take advantage of the excess heat available at the absorber under circumstances where the full heating capacity of the system is not required for the ambient conditions being serviced by the load. Such excess heat may be available in either the cooling mode or heating mode when the system is not loaded to its designed capacity. In those circumstances when the system is not operating or there is no excess heat available at the absorber 97, the auxiliary burner may be operated to assure that there is the required domestic hot water available.

A Living Space Environmental Conditioning Apparatus

Figure 5:
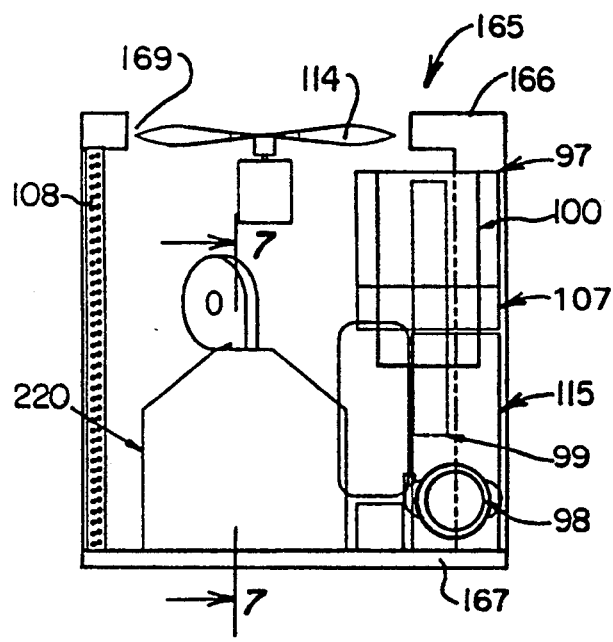
FIG. 5 is a schematic elevational sectional view of one embodiment of the apparatus and system of this invention as it could be constructed for installation adjacent to a building having a cooling and/or heating load.
Figure 6:
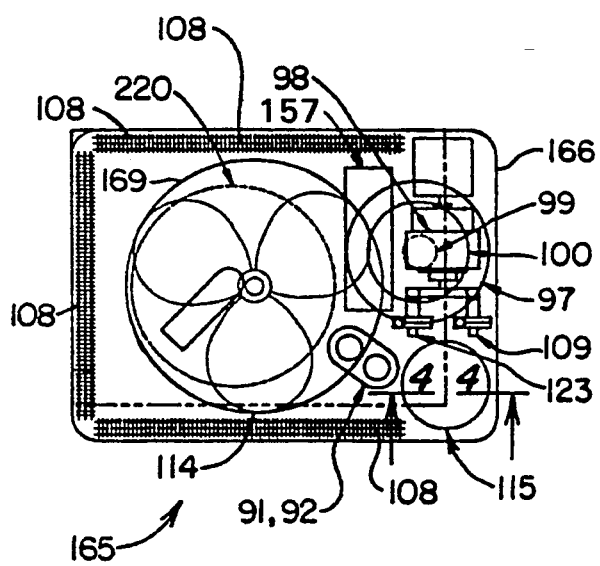
FIG. 6 is a schematic plan view of the embodiment of the apparatus shown in FIG. 5.

A configuration for a living space, residential air conditioning and heating embodiment of this invention is shown in FIGS. 5 and 6, in which an air conditioning and heating unit 165 is located outside a residence and constructed in rectangular format on a base 167, and includes a housing 166. The housing 166 includes an upper aperture 169. The aperture is positioned above an ambient air inductive means such as the fan 114 (See FIG. 1). The generator/recuperator means 220 is located below aperture 169. The first heat exchanger 108 comprises three sides of the unit 165. Conveniently positioned as shown on the fourth side, are the solution pump 98, purge pot 99, evaporator 115, condenser 100, absorber 97 and recuperator 107. The separators 91 and 92 (as shown in FIG. 8 in longitudinally vertical position) are positioned nearby. Pumps 123 and 109 for conveying the working fluid are juxtaposed to the solution pumps 98 and 157. The second heat exchanger 121 and the fan 122 are located within the living space.

Double Effect Generator and Recuperator Apparatus

Referring to FIGS. 5, 6, and 7, an embodiment of a double effect generator/recuperator means 220 is shown as apparatus which integrates in one interrelated assembly the various components and modules that are associated with the use of the heat generated in a heat source 84. To facilitate understanding, numerical designations are the same as and refer to like components in the system shown in FIG. 1.

Generator Module

As shown in FIG. 7, a generator unit or module 220 is generally symmetrically constructed about a substantial vertical central axis. Generator module 220 includes a generator housing 221 that may be circular in the plan view (FIG. 6) and which is constructed on a generator frame base 222 that may be the same or distinct from the base 167 of the heating and air conditioning unit 165 (FIGS. 5 and 6). Generator unit 220 contains a circular floor 230 attached to the generator housing 221 above the generator base 222 so as to contain insulating material 231. Generator floor 230 slopes gently from the center to the generator housing 221 so as to allow for the drainage of condensed moisture from the unit.

The generator housing 221 includes an upper generator shroud 223 and a generator ceiling 224 between which is placed insulating material 225. A cylindrical passage 226 is formed by a cylinder 227 joining the center portion of the shroud 223 and the center portion of the generator ceiling 224. A cylinder cap 228 seals the cylinder 227 from the surrounding atmosphere and provides a mounting surface to which generator blower 229 is attached. Cylinder cap 228 contains an aperture (not shown) that allows air from the blower 229 to enter the generator unit 220 through cylindrical passage 226.

A central driving heat source 84 providing external heat to the system, typically a gas burner, is centrally positioned substantially on a central axis 232 of unit 220. A gas source is not shown but it is to be understood to be of conventional piping design. Annular components surround the circular heat source 84 and include a first generator means (desorber means) 80, a first (high-temperature) recuperator means 86, a second generator means 81, and a second (low-temperature) recuperator means 95. Each component is constructed as a plurality of coils, juxtaposed one to the next, in a substantially or generally annular composite form i.e., vertically positioned toruses or helices. Components are juxtaposed one to the next, and radially more or less distant from the central axis 232, i.e., surrounding the source of heat 84 at varying distances. The generator 80 coils have fine fins that allow for the passage of hot gases between and among the coils so as to achieve maximum heat transfer. See, for example FIG. 5 item 200 of U.S. Pat. No. 4,742,693 which is herein incorporated by reference. First and second recuperators and the second generator have coils with a solid exterior surface that are wound in contact with each other.

The recuperators, 86 and 95, and second generator 81, have an inner tube and an outer tube arranged in what is often referred to as tube-in-tube construction. Preferably the inner tubes have helical flutes 233 to better effect heat transfer between the fluids in the inner and outer tubes. Fluted tubes are available commercially from suppliers such as Turbotec Products, Inc., Windsor, Conn., and Delta-T Limited, Tulsa, Okla. The liquid-liquid heat exchangers and absorbers have three flutes. Evaporators and condensers have four flutes and about three times as many flutes per foot. That is, not only do the evaporators and condensers have more flutes but they also are twisted more revolutions per foot.

Tubing materials are conventional, being chosen for good heat transfer through the walls of the tubing and corrosion resistance. Metals such as stainless steel and low alloy steels such as AISI 9260 and AISI 1075 are suitable. Generator 80 is typically of conventional single tube construction with small, fine fins.

In the preferred embodiment shown in FIG. 7, high-temperature air and combustion products (flue gas) 245 are generated in a first generator chamber and impinge upon the walls 131 of the tubular generator 80 being driven more or less downward and radially outward direction through the fins between the coils of generator 80 by blower 229. The hot combustion products 245 emerge through apertures 235 in cylindrical baffle 234 and flow downward along the solid inner cylindrical first recuperator housing baffle 236 where they emerge through apertures 238 in the bottom of inner recuperator housing 236.

The hot air and combustion products 245 then enter a second (recuperator) chamber 237 surrounding the first generator chamber through apertures 268 in the bottom housing 250 of the first recuperator chamber 237. The hot air and combustion products 245 impinge upon the coils of tube 249 of the first recuperator 86 while flowing in a generally upward direction. The warm combustion products and air 245 emerge into a third or outer chamber 240 of the generator unit from the second chamber 237 through apertures 312 located in the top portion of the outer recuperator housing 239. The warm combustion products and air 245 impinge upon the coils of tube 252 of the second generator 81 and the coils of tube 260 of the second recuperator 95 while flowing in a generally downward direction. Combustion products and air 245 emerge from the generator unit 220 through apertures 241 in the generator housing 221 located just above the generator floor 230.

The generator, recuperator, and other chambers are concentric cylindrical chambers juxtaposed one to the next. The general flow of combustion products and air is indicated by arrows in FIG. 7 as being generally in a serpentine fashion, i.e. downward in the first chamber, upward in the second chamber, and downward in the third chamber.

The first generator means 80 is made from a finned double-wound helical coil of tubing. Strong solution 83 enters the first generator 80 from the first (high temperature) recuperator 86 through inlet 137 at a temperature of about 385° F. and a pressure of 1490 psia. The strong solution 83 is heated by the heat source 84 as it flows downward through the outer winding of helical coil and then upward through the inner winding of the helical coil emerging from the first generator means 80 through outlet 138 at a temperature of about 415° F. The strong solution 83 receives direct heat from the heat source 84 at a rate of about 36,000 btu/hr.

As shown in FIGS. 1 and 8, the heated strong solution 83 then enters the first (primary) separator 91 through separator inlet 242 where it separates into intermediate solution 85 and refrigerant vapor 82. The intermediate solution 85 leaves separator 91 through lower outlet 243. The refrigerant vapor 82 leaves separator 91 through upper outlet 244.

Returning to FIG. 7, the intermediate solution 85 enters the first recuperator 86 through inner fluted-tube inlet 246. First recuperator 86 consists of three rows of a fluted tube-in-tube helical windings located radially outwardly adjacent to first generator 80 and extending vertically for almost the length of the first generator 80. The first recuperator 86 is contained in the cylindrical first recuperator chamber 237 that is formed by inner cylindrical baffle 236, outer cylindrical recuperator housing 239, the generator unit ceiling 224 and first recuperator housing bottom 250. As the intermediate solution 85 passes through the fluted inner tube 248 of recuperator 86, it exchanges heat to the strong solution 83 in the outer tube 249 of the recuperator 86 at a rate of about 69,000 btu/hr and leaves through the inner tube outlet 247 at a temperature of 245° F. and a pressure of 1450 psia. Intermediate solution 85 is then throttled substantially isenthalpically through valve 87 (FIG. 1) and arrives at the secondary generator 81 at a temperature of 245° F. and a pressure of 290 psia.

The intermediate solution 85 enters the second generator means 81 through outer tube inlet 251. The second generator 81 consists of two rows of fluted tube-in-tube helical windings located radially outwardly adjacent to first recuperator 86 and extending vertically along the top portion of the first recuperator 86. The second generator 81 is contained in the upper portion of the cylindrical outer-most generator-unit chamber 240 that is formed by the outer cylindrical first recuperator housing 239, the generator unit housing 221, the generator unit ceiling 224 and the generator unit floor 230. As the intermediate solution 85 passes through the outer tube 252, approximately 18,000 btu/hr is transferred to it from the condensing refrigerant vapor 82 in the inner fluted tube 253. About an additional 1,000 btu/hr is transferred to the intermediate solution 85 in the outer tube 252 from the circulating flue gases 245. The intermediate solution 85 leaves the second generator 81 through second generator outer tube outlet 254 at a temperature of 255° F. and a pressure of 290 psia. As shown in FIGS. 1 and 8, the heated intermediate solution 85 then enters the second (secondary) separator 92 through separator inlet 255 where it separates into weak solution 89 and refrigerant vapor 82. The weak solution 89 leaves separator 92 through lower outlet 256. The refrigerant vapor 82 leaves separator 92 through upper outlet 257.

Weak solution 89 leaves the separator 92 at a pressure of 290 psia and a temperature of 255° F. and enters the second recuperator 95 through second recuperator inner fluted-tube inlet 258. The second recuperator 95 consists of two rows of fluted tube-in-tube helical windings located radially outwardly adjacent to first recuperator 86 and extending vertically along the lower-upper and lower portions of the first recuperator 86. The second recuperator 95 is contained in the lower upper and lower portions of the cylindrical outer-most generator-unit chamber 240 that is formed by the outer first recuperator housing 239, the generator unit housing 221, the generator unit ceiling 224 and the generator unit floor 230. As the weak solution 89 passes through the fluted inner tube 259 of the second recuperator 95, it transfers approximately 50,000 btu/hr to the strong solution 83 in outer tube 260 as the strong solution 83 is on its way to the first recuperator 86. The weak solution leaves the second recuperator 95 through the inner fluted-tube outlet 261 and is then throttled substantially isenthalpically through valve 96 (FIG. 1) and arrives at connection 93 at a temperature of 120° F. and a pressure of 70 psia.

High pressure vapor 82 from the upper outlet 244 of separator 91 enters the second generator 81 through inner fluted-tube inlet 262 at a temperature of 415° and pressure of 1480 psia. While circulating through fluted inner tube 253, the vapor is condensed liberating approximately 18,000 btu/hr to the intermediate solution 85 in outer tube 252. The condensed vapor 82 leaves the second generator 81 through inner fluted-tube outlet 263 at a temperature of about 260° F. Passage of the condensed vapor 82 through expansion valve 105 (FIG. 1) reduces its temperature to 120° F. and its pressure to 290 psia. The expanded vapor 82 is joined with the vapor 82 from the secondary separator 92 at connection 94 (FIG. 1).

After the vapor 82 is absorbed into the weak solution 89 in the absorber 97 and the resulting strong solution 83 passes through the purge pot 99 and pump 98, it enters the secondary recuperator 95 at a temperature of 120° F. and a pressure of 1550 psia through outer tube inlet 264. While circulating through the outer tube 260, the strong solution receives 50,000 btu/hr from the weak solution 89 in the inner fluted tube 259 and an additional 1,000 btu/hr from the circulating flue gases 245. On leaving the secondary recuperator 95 through outer tube outlet 265, the strong solution 83 is at a temperature of 230° F. and a pressure of 1520 psia.

From the secondary recuperator 95, the strong solution enters the primary recuperator 86 through outer tube inlet 266. While circulating through the outer tube 249, the strong solution 83 receives 69,000 btu/hr from the intermediate solution 85 circulating in the fluted inner tube 248 and an additional 1000 btu/hr from the circulating flue gases 245. The strong solution 83 leaves the primary recuperator 86 through outer tube outlet 267 at a temperature of 385° F. and a pressure of 1490 psia.

Although the preferred embodiment is shown and described, other arrangements may be suitable for different operating conditions. For example, the solutions within fluted tubes and that in the annulus may be switched one for the other, especially in the low temperature recuperator 95 where it might be preferable not to have the higher pressure fluid in the annulus.

Absorber and Condenser Module

Figure 3:
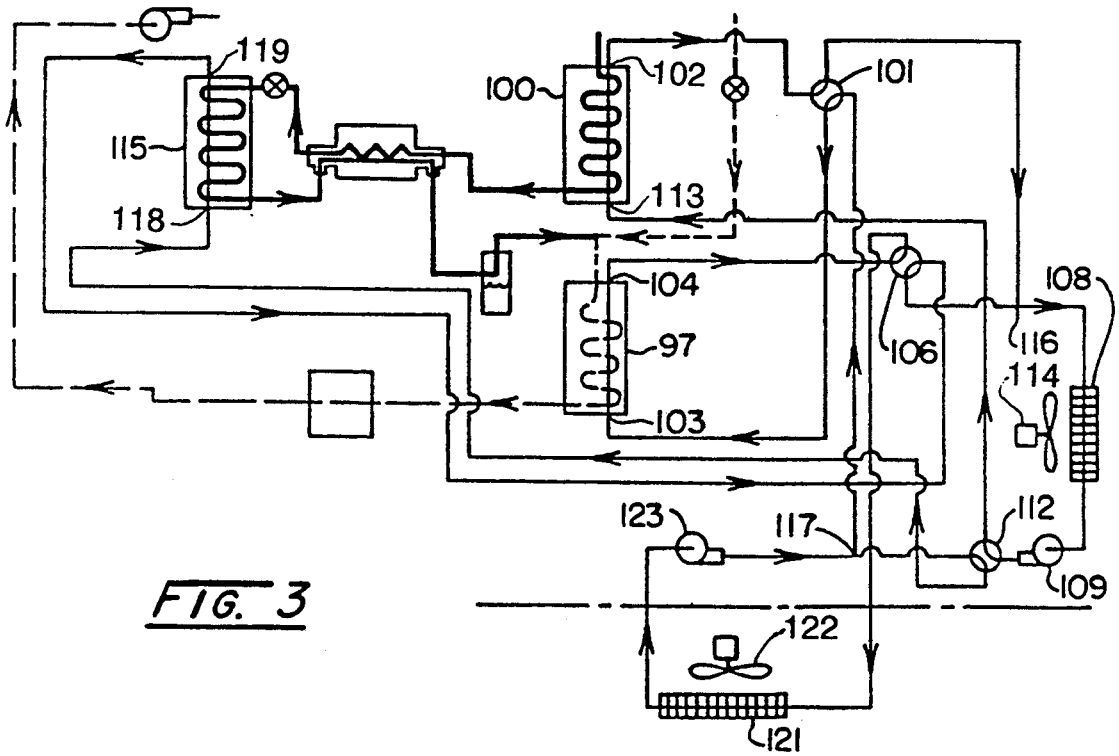
FIG. 3 is a diagram as in FIG. 2 of the double effect absorption system of this invention in the defrost mode.
Figure 9:
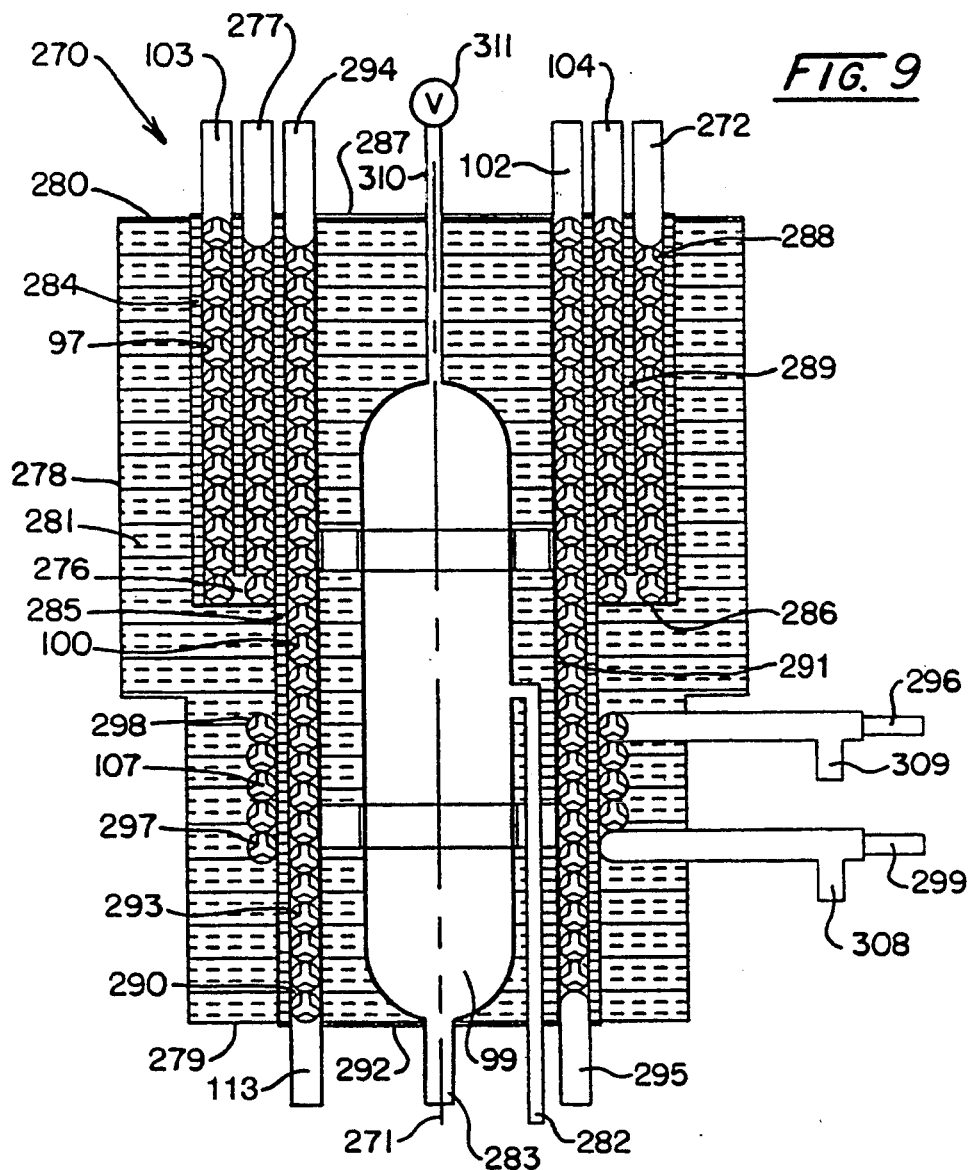
FIG. 9 is a schematic cross-section elevational view of the absorber/condenser module of this invention with auxiliary components.

Referring to FIG. 9, an integrated absorber/condenser module provides for the assembly of condenser 100 and absorber 97 components that are schematically shown in FIGS. 1–3. The absorber/condenser module integrates in one interrelated assembly the various components of the apparatus that are associated with the use of the heat generated in the driving heat source 84 for heating, cooling and defrosting.

It is to be noted that the primary (refrigerant) system, using preferably an ammonia/sodium thiocyanate refrigerant pair, is completely contained in the outside heating and air conditioning unit 165 and operates in continuous fashion without the switching of flows among the various components. The working subsystem, using preferably a water/glycol working fluid, transfers heat among the load (inside space), ambient outside air, and outside heat exchanger depending on whether the system is operating in a heating, cooling or defrosting mode.

Heat exchange between the refrigerant system and the hydronic working fluid subsystem occurs in the absorber/condenser module 270 and specifically in the absorber 97 and the condenser 100. The absorber/condenser module consists of an absorber 97, a purge pot 99, a condenser 100 and a third (tertiary) recuperator means 107. The tertiary recuperator 107 is preferably fluted tube-in-tube construction. The absorber 97 and condenser 100 are of fluted tube-in-cylinder construction.

The purge pot 99 is centrally positioned substantially on a central axis 271 of the annular components including the absorber 97, condenser 100 and the third recuperator 107. Each component is constructed as a substantially annular coil, or coils and/or plurality of vertically positioned toruses or helical tubings. The absorber 97 and the third recuperator 107 are juxtaposed to the condenser and are radially more distant from the central axis 271.

The absorber/condenser module 270 is contained in cylindrical housing 278 with a bottom 279 and top 280. Insulation 281 is provided between the cylindrical housing 278 and the outer most components.

The absorber 97 consists of two windings of fluted tube enclosed in a cylindrical space 276 formed by outer cylindrical absorber wall 284, outer condenser wall 285, absorber bottom 286 and absorber top 287. The inner and outer windings are separated by cylindrical baffle 289. Baffle 289 is attached to absorber top 287. Generally a winding may be considered as a plurality of coils juxtaposed one to the next in a generally annular composite form, i.e., a cylindrical helix.

Weak solution and refrigerant mixture enter the outer winding of fluted tube 288 at the top of the absorber, flow generally downward and then generally upward in the inner winding, i.e. in directions generally parallel to the axis of the absorption coils. Working fluid enters cylindrical space 276 through inlet 103 and circulates generally downward and through and among the spaces formed by the juxtaposed fluted-tube outer windings. The working fluid passes beneath the lower edge of baffle 289 and then circulates generally up and through and among the spaces formed by the juxtaposed fluted-tube inner windings. The working fluid leaves absorber 97 through outlet 104. Week solution 89 meets the refrigerant 82 at connection 93 and enters the absorber 97 through fluted inner-tube inlet 272 at a temperature of about 144° F. and a pressure of about 70 psia. The refrigerant 82 is absorbed into the weak solution 89 with release of an absorption heat of 52,000 btu/hr to the working fluid circulating in cylindrical space 276. Strong solution 83 leaves the absorber 97 through fluted inner-tube outlet 277 at a temperature of about 118° F. and a pressure of about 70 psia.

After leaving absorber 97, strong solution 83 enters purge pot 99 through inlet 282 and exits the purge pot through outlet 283. The purge pot is used to remove periodically non-condensable gases formed in the system through the vent line 310 and valve 311.

Preferably, the condenser 100 comprises a single winding of fluted tube 293 i.e., a plurality of coils juxtaposed one to the next in generally annular composite form, extending the vertical length of the absorber/condenser unit 270 and enclosed in the cylindrical condenser space 290 formed by inner cylindrical condenser wall 291, outer cylindrical condenser wall 285, absorber/condenser top 287 and condenser bottom 292 i.e., tube-in-cylinder construction. Although less preferred, tube-in-tube construction may also be used. If tube-in-tube construction is used, the working fluid preferably circulates in the outer tube.

Hydronic working fluid enters the condenser space 290 through inlet 113, circulates around and through the spaces formed by the juxtaposed coils of fluted tube 293 in a direction generally parallel to center line 271 (in cross flow to the flow of vapor 82 in tube 293) and leaves through outlet 102. Refrigerant vapor 82 enters the condenser 100 through inlet 294 at a temperature of 120° F. and pressure of 290 psia. Vapor 82 condenses in fluted tube 293 transferring a condensation heat of 27,000 btu/hr to hydronic working fluid circulating in condenser cylindrical space 290. Condensed refrigerant vapor 82 leaves the condenser through outlet 295 at a temperature of 100° F. and a pressure of 290 psia.

The third (tertiary) recuperator means 107 is a single fluted tube-in-tube winding juxtaposed radially outward from condenser 100. Condensed vapor 82 from condenser outlet 295 enters the tertiary recuperator 107 through fluted-tube inlet 296 and circulates through inner fluted tube 297 where it transfers 610 btu/hr to vapor 82 in the outer tube 298. Condensed vapor 82 leaves tertiary recuperator 107 through fluted-tube outlet 299 at a temperature of 90° F. and a pressure of 285 psia.

After leaving the tertiary recuperator 107, condensed vapor 82 passes through expansion value 110 after which it enters evaporator 115 at a pressure of 72 psia and a temperature of about 39° F. through evaporator inlet 306. The condensed vapor 82 evaporates in fluted tube 305 absorbing 36,000 btu/hr from the circulating hydronic working fluid in evaporator cylindrical space 302. The evaporated vapor 82 leaves evaporator 115 through outlet 307 at a temperature of about 53° F. and a pressure of about 72 psia.

After leaving the evaporator, the refrigerant vapor 82 enters the tertiary recuperator 107 through outer tube inlet 308, circulates through outer tube 298 receiving 610 btu/hr from the condensed vapor 82 in inner fluted tube 297, and leaving by outer tube outlet 309 at a temperature of about 67° F. and a pressure of about 71 psia. After leaving the tertiary recuperator, vapor 82 enters accumulator 205.

Figure 4:
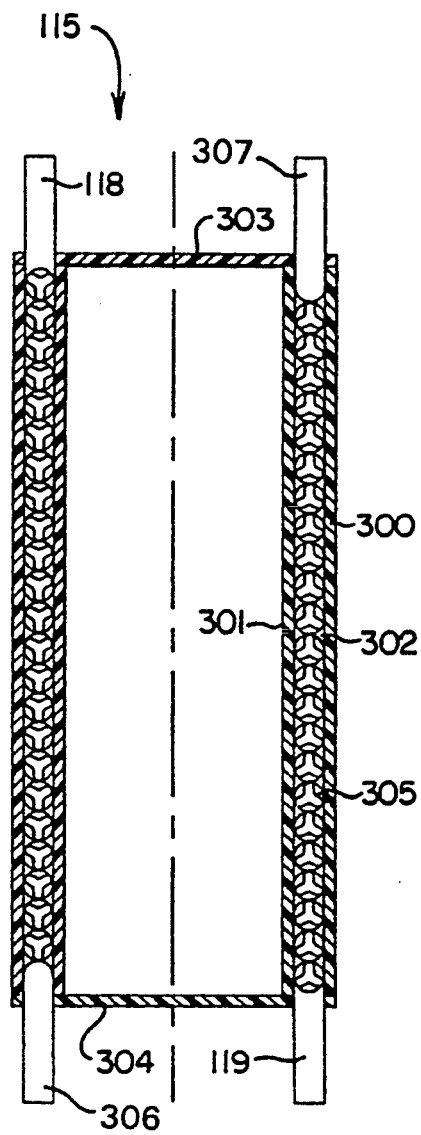
FIG. 4 is a cross-sectional elevational view of the evaporator apparatus of this invention taken on the line 4—4 of FIG. 6.

As shown in FIG. 4, evaporator 115 is a cylindrical unit with a cylindrical outer housing 300, a cylindrical inner housing 301, a top 303 and a bottom 304 forming cylindrical space 302. An annular winding of fluted tube 305 is contained in cylindrical space 302. Hydronic working fluid enters the evaporator 115 through inlet 118 and circulates generally downward over, through and among the spaces formed from the juxtaposed windings of fluted tube 305. The hydronic fluid leaves the bottom of evaporator 115 through outlet 119.

Although the preferred embodiment is shown and described, other arrangements may be suitable for different operating conditions. For example, the solutions within fluted tubes and that in the annulus may be switched one for the other, especially in the low temperature recuperator 95 where it might be preferable not to have the higher pressure fluid in the annulus. The third recuperator 107 could also be mounted on the outside of the evaporator coil 115 in a fashion similar to the way it is shown as on the outside of the condenser 100. The purge pot 99 need not be inside the absorber/-condenser. The chosen location however does conserve space. An expansion tank to allow for expansion and contraction of the heat transfer fluid (ethylene glycol/-water) could similarly be placed inside the evaporator.

| HYDRONIC WORKING FLUID TEMPERATURES | | |
| --- | --- | --- |
| | INLET | OUTLET |
| Condenser | 105° F. | 100° F. |
| Absorber | 100 | 120 |
| Evaporator | 55 | 45 |
| Outdoor Heat Exchanger | | |
| Heating Mode | 40 | 45 |
| Cooling Mode | 120 | 105 |
| Indoor Heat Exchanger | | |
| Heating Mode | 120 | 105 |
| Cooling Mode | 45 | 55 |

Divided-Flow Heat Transfer System

One of the objects of this invention is to provide improved heat exchange between the various fluids involved in heat pump design. To this end, improvements in heat transfer configurations are provided. Tube-in-cylinder (confined cross-flow) heat transfer devices are used to transfer heat between a first fluid flow (including, but not limited to, gases, condensing gases and liquids) in spirally wound coils and a second cross-flow fluid circulating around and over those coils in an annular cylinder. As shown in FIGS. 4 and 9, basic tube-in-cylinder construction consists of a plurality of coils in a generally annular composite form that is enclosed in an annular cylinder.

Figure 17:
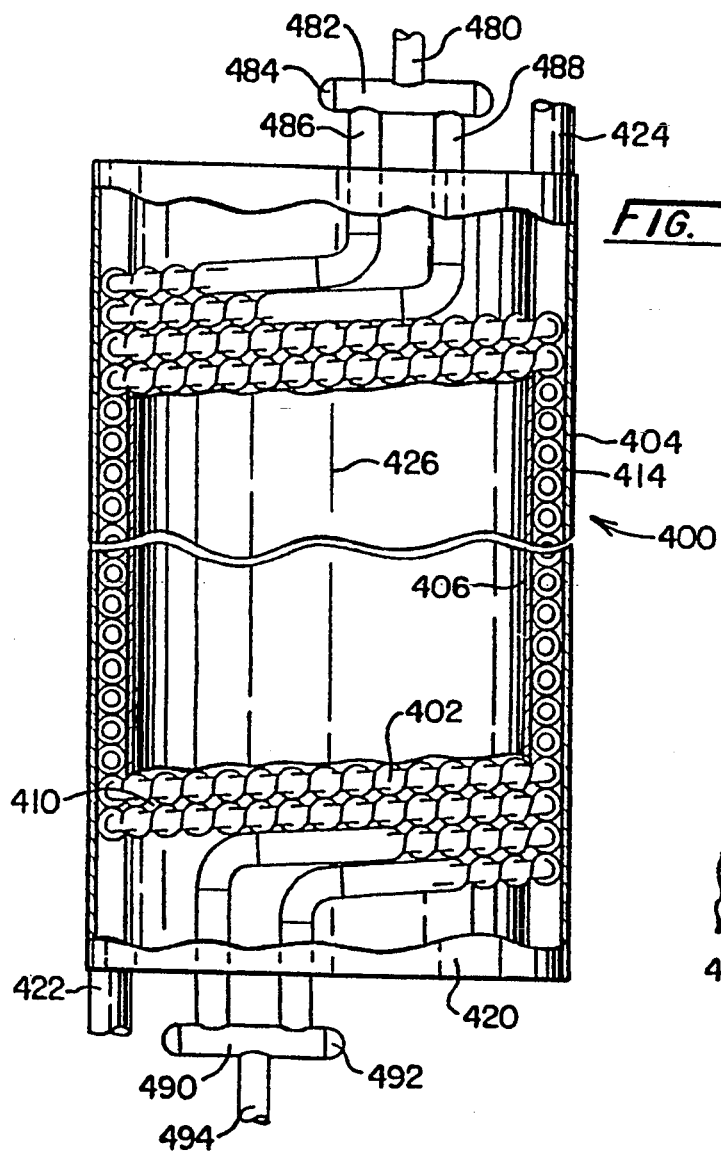
FIG. 17 is a partial cut-way plan view of the divided flow tube-in-cylinder heat transfer device of this invention.
Figure 14:
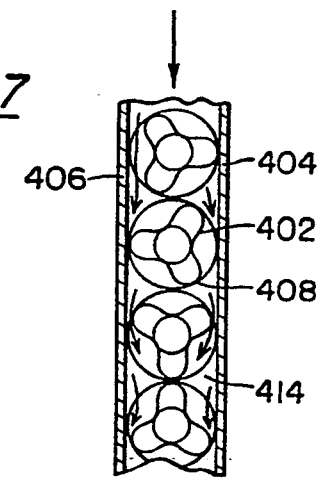
FIG. 14 is a partial cross-sectional side view of a tube-in-cylinder device of this invention.
Figure 15:
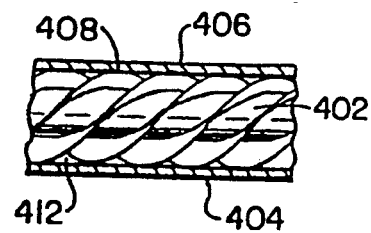
FIG. 15 is a partial cross-sectional top view of a tube-in-cylinder device of this invention.
Figure 16:
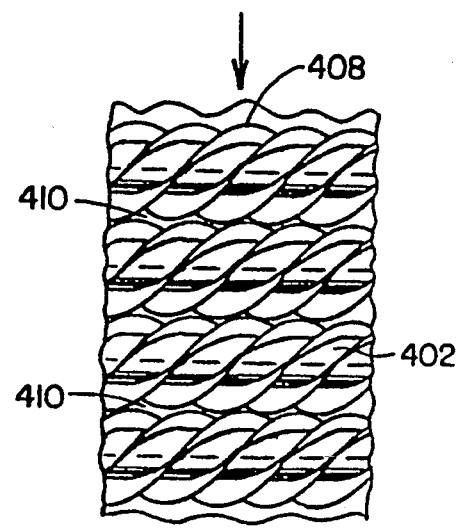
FIG. 16 is a partial cross-sectional plan view of a tube-in-cylinder device of this invention.

Preferably and as shown in FIGS. 14-17, the spiral coils are constructed of fluted tubes 402. As a result, the second cross-flow heat-exchange fluid flows in a direction generally perpendicular to the coils (indicated by arrows in FIGS. 14 and 16) in the voids formed by the exterior surface of tubes 402 and the interior walls (404 and 406) of the enclosing annular cylinder 420 said voids existing 1) as a result of the crests 408 of the fluted tubes 402 contacting the walls 404 and 406 of the confining annular cylinder 420 (voids 412; FIG. 15), 2) as a result of the crests 408 contacting each other (voids 410; FIGS. 16 and 17), and 3) as a result of the circular shape of the fluted tubes 402 when placed next to each other and within the walls 404 and 406 of the confining cylinder 420 (voids 414; FIGS. 14 and 17). The general flow direction of the second fluid is shown in FIG. 17 where the fluid enters at inlet 422, flows upward in a direction generally parallel to the axis 426 of the spirally wound, juxtaposed coils, and then leaves through outlet 424.

It has been found advantageous to divide the fluid flow within a single coil into at least two separate flows as shown in FIG. 17. By using such a divided flow arrangement, large pressure drops can be avoided. For example, a single flow fluted-tube design such as shown for the absorber in FIG. 9 gives a pressure drop of about 8 psi while the use of the double-flow fluted-tube design of FIG. 17 gives a pressure drop of about 1.5 psi under similar operating conditions.

To achieve a divided flow, a first fluid flow enters circular manifold 482 with end caps 484 through inlet 480 and is divided into at least two separated first fluid flows as a result of entering the two fluted tube lines 486 and 488. The fluted tube lines are wrapped around the inner wall 406 of the annular cylinder 420 as a single row of coils. As a result, each coil of divided line 486 is next to a coil of divided line 488 to form a generally annular cylindrical composite form. That is, each coil of a set of the plurality of coils for line 486 is juxtaposed next to a coil of the second set of plurality of coils formed by line 488. After the separated flows pass through the juxtaposed fluted coils, they can be recombined by connecting lines 486 and 488 to circular recombining second manifold 490 with end caps 492 resulting in a combined single flow emerging from outlet 494.

Figure 18:
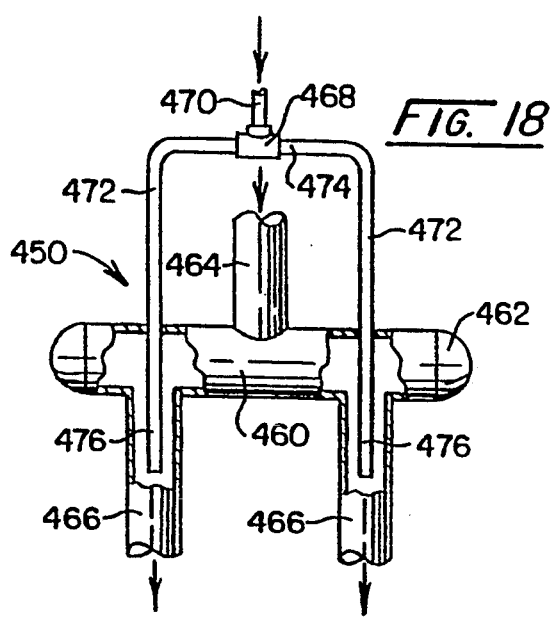
FIG. 18 is a partial cut-away plan view of the divided flow mixing device of this invention.

To further improve the division and mixing of two fluids such as the vapor and solution of an absorber when using the divided flow arrangement of FIG. 17, a general dividing and mixing device 450 has been developed. As shown in FIG. 18, the device 450 consists of a dividing manifold 460 with end caps 462 that is connected to two fluted tube lines 466 in a manner similar to that shown in FIG. 17. A third fluid flow enters a tee 468 through inlet leg 470 where it is divided into separated third fluid flows on entering one end 474 of tubing 472. Tubing 472 traverses the wall of manifold 460 and extends into fluted tube 466 for a sufficient distance so as to mix the third fluid flow emerging from tubing end 476 essentially only with the separated first fluid flow in line 466.

The double-flow fluted-tube design can be used in condensers, absorbers, recuperators, evaporators and the like. For heat-pump condensers and evaporators, the refrigerant is the first fluid which circulates through the juxtaposed coils while the hydronic fluid is the second fluid that circulates through the annular cylinder. For an absorber, the refrigerant vapor is the first fluid and the absorbent liquid is the third fluid. These fluids are divided and mixed using the mixing device 450 and circulates through the spiraled coils where it transfers the heat of absorption to a hydronic second fluid circulating through the annular cylinder. For recuperators, the heat transfer is between components of the system rather than with a hydronic fluid. For example, in a tertiary heat exchanger, the transfer is between the liquid phase refrigerant (first liquid) flowing through the coils and the vapor phase refrigerant (second liquid) flowing through the annular cylinder. It is possible to switch the fluids in the coils and annular cylinder. Such substitutions are considered equivalent to the above described flows for the purposes of this invention. Moreover, the dual-flow heat transfer devices of this invention are expected to have applicability to a variety of other heat exchange requirements not related to heat pump design.

Solution Pump and Energy Recovery Apparatus

In the operation of the absorption refrigeration system of this invention a mechanical energy input is necessary in addition to the thermal energy input. The necessary mechanical energy is primarily required for operation of the solution pump which circulates the solution pair through the system. In FIGS. 1, 2, and 3 the solution pump 98 is shown conveying the strong solution from the absorber 97 to the first generator means 80 by way of the second and first recuperators 95 and 86 respectively. In a system capacity of 36,000 BTU per hour, the mechanical energy required to raise the solution pressure to about 1200 psia is approximately 670 watts. Providing this mechanical energy using a convention electric motor and pump would require consumption of approximately 1200 watts of electrical power which would reduce the refrigeration cycle efficiency (COP) by approximately 11%. The Prior Patent describes an energy recovery system for recovering energy from the isenthalpic throttling valves required for the system.

Figure 10:
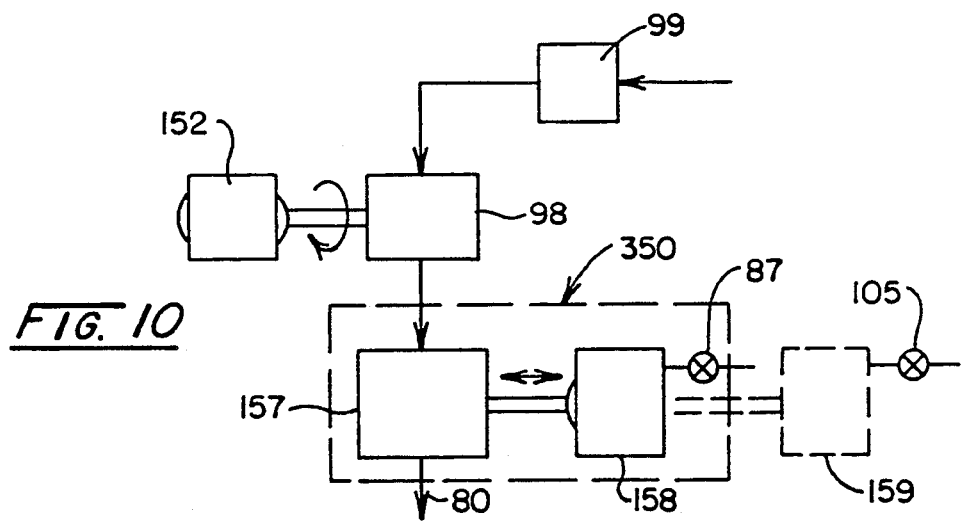
FIG. 10 is a schematic diagram of one embodiment of the energy recovery apparatus arrangement of this invention.
Figure 11:
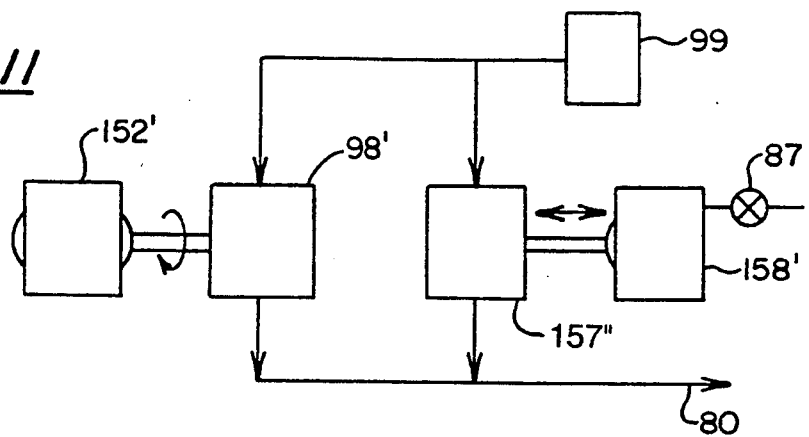
FIG. 11 is a schematic diagram of one embodiment of the energy recovery apparatus arrangement of this invention.

In this invention, an alternate energy recovery system has been further refined as shown in FIGS. 10 and 11.

In FIG. 10, one embodiment of the improved energy recovery apparatus includes rotary motor means 152 driving a solution pump means (which may be either rotary or reciprocating) 98 receiving strong solution from the purge pot 99. The solution pump 98 raises the strong solution to an intermediate pressure and conveys the solution to a second higher pressure solution pump 157, where the pressure is raised to the high pressure requirements of the system before conveying the strong solution through recuperators 95 and 86 to the first generator 80.

The second pump 157 may be located between low temperature recuperator 95 and high temperature recuperator 86, (shown in phantom in FIG. 1 as 157'). In that way both the pump 157 and motor(s) 158 and 159 would all be at more nearly equal temperatures. Also both pipes of the low temperature recuperator 95 would be at more nearly equal pressures—significantly lower than the primary generator pressure.

The solution pump 157 is driven by energy recovery means 158 and, alternatively, also by additional energy recovery means 159.

Solution pump 98 is preferably an electric motor driven pump of conventional design. Solution pump 157 may be either a rotary pump or a reciprocating pump more suitable for high pressure service, being driven by reciprocating expansion devices operating through the pressure let down of the expansion means 87 and 105.

In the construction according to FIG. 10, the energy recovery motors are not mechanically connected to the shaft of the motor 152 providing more flexibility in the operation of the solution pump and energy recovery arrangements than in the embodiment of the Prior Patent where the opposite direct connection was provided. Although the pressures generated in the pumps 98 and 157 are additive to produce a sum pressure at the generator 80, each pump is operating independently under the influence of an independent motive system.

In FIG. 11, the motor 152' drives a solution pump 98'. The second solution pump 157'' is driven in reciprocating motion by an energy recovery device 158' connected to the pressure expansion valve 87. In this alternative embodiment the strong solution enters the pumps 98' and 157'' at the same suction pressure. However, on the discharge side, the outlets from the pumps are combined at the same pressure. The flow to the generator 80 is the sum of the two flows.

In either the embodiment of FIG. 10 or the embodiment of FIG. 11 sufficient energy recovery is provided to contribute significantly to increase the COP to a range of about 0.8 in cooling mode.

Figure 12:
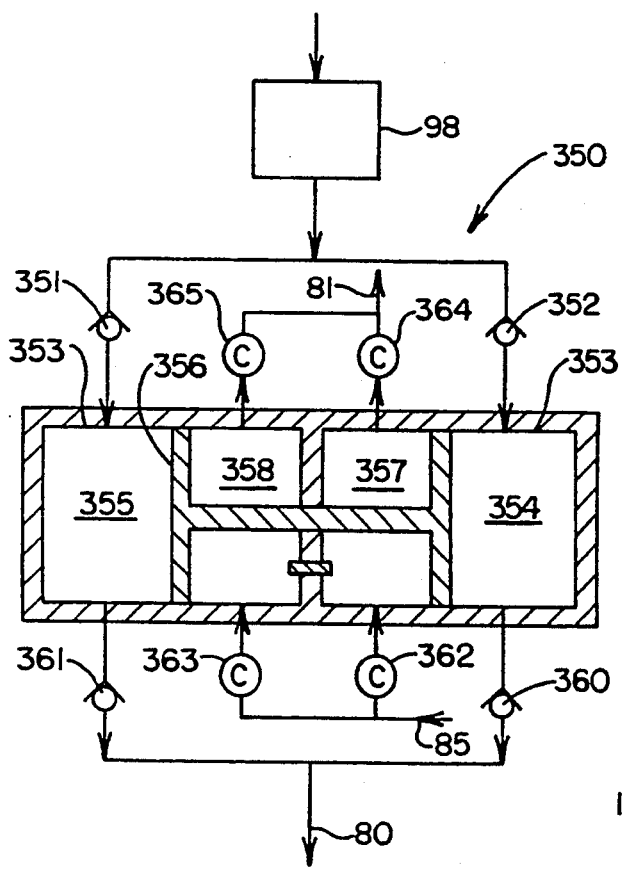
FIG. 12 is a schematic view of an alternative energy recovery unit included in this invention.

Referring to FIG. 12, an energy recovery motor combining components 157 and 158 is shown as energy recovery means 350. Unit 350 is fed by solution pump 98. The output of solution pump 98 is divided and passes through check valve means 351 and 352 to opposite ends of the reciprocating piston pump 350 comprising a cylinder 353 centrally divided into chambers 354 and 355 by opposite ends of a reciprocating piston 356. Piston 356 divides the chambers 354 and 355 into second chambers 357 and 358 respectively. Chambers 354 and 355 are provided with outlets through check valve means 360 and 361 respectively. Check valve means are connected together to provide a connection to the first primary generator means 80.

Solution 85 at high pressure is provided to the second chambers 357 and 358 respectively through control valves 362 and 363 respectively. Solution leaves the chambers 357 and 358 through control valves 364 and 365 to the secondary generator 81. The control valves 362, 363, 364 and 365 operate to time the admission of high pressure solution to the chambers 357 and 358 and cause the piston 356 to reciprocate raising the solution pressure to the higher level requirements at the primary generator 80. Energy recovery through reciprocating motion and devices of this type are available from the Recovery Engineering Inc. of Minneapolis, Minn. The details of their construction and operation are not a part of this invention.

It is herein understood that although the present invention has been specifically disclosed with the preferred embodiments and examples, modifications and variations of the concepts herein disclosed may be resolved to by those skilled in the art. Such modification and variations are considered to be within the scope of the invention and the appended claims.

We claim:

1. A divided-flow tube-in-cylinder heat transfer device comprising:
   a. a means to divide a first fluid flow into at least two separated first fluid flows;
   b. sets of a plurality of coils formed in a generally annular cylindrical composite form from twisted fluted tubes having raised longitudinal helical crests on the exterior surface of said tubes with corresponding interior helical troughs on the interior surface of said tubes and longitudinal helical troughs adjacent to said exterior crests on said exterior surface of said tubes with corresponding interior raised helical crests on said interior surface of said tubes with each set of said plurality of coils receiving one of said separated first fluid flows and with each coil of one set of said plurality of coils juxtaposed one to the next and contacting another coil of another set of said plurality of coils; and c. an annular cylindrical enclosing and contacting said sets of juxtaposed and contacting coils, with said exterior surface of said tubes and the interior walls of said annular cylinder forming voids, said voids existing:
1) between juxtaposed contacting coils as a result of said troughs adjacent to said raised crests, said raised crests on one coil contacting the raised crests on an adjacent juxtaposed coil;
2) between said coils and said interior cylinder walls as a result of said troughs adjacent to said raised crests, said crests on said coils contacting said interior annular cylinder walls; and
3) between said coils and said interior cylinder walls as a result of the circular shape of said coil tubes, said coils in contact with each other and said interior cylinder walls, said voids configured to defined means to allow a second fluid to flow in cross-flow:
1) around and between said juxtaposed coils in said troughs and voids adjacent to said crests;
2) over said coils and between said coils and said interior cylinder walls in said troughs and voids adjacent to said cylinder-wall contacting crests;
3) between said coils and said interior cylinder walls in said voids formed as a result of the circular shape of said coil tubes in contact with each other and said interior cylinder walls, and
4) in an overall direction generally perpendicular to said coils and parallel to the axis of said coils.

2. The divided-flow tube-in-cylinder heat transfer device of claim 1 wherein said means to divide said first flow is a first manifold with a line for receiving said first fluid flow and with said manifold connected to said sets of juxtaposed coils, said sets of coils receiving said separated first fluid flows.

3. The divided-flow tube-in-cylinder heat transfer device of claim 1 further comprising a means for combining said separated flows emerging from sets of juxtaposed coils into a single flow.

4. The divided-flow tube-in-cylinder heat transfer device of claim 3 wherein said means to combine said separated flows emerging from said sets of juxtaposed coils is a second manifold connected to said sets of coils so as to receive said separated first fluid flows therefrom and having an outlet port for said combined first fluid flows.

5. The divided-flow tube-in-cylinder heat transfer device of claim 1 further comprising a means for dividing a third fluid flow into at least two separated third fluid flows and mixing said separated third fluid flows with said separated first fluid flows.

6. The divided-flow tube-in-cylinder heat transfer device of claim 5 with said third fluid flow dividing and mixing means comprising:
a. a means to divide said third fluid flow into at least two separated third fluid flows; and
b. a plurality of means with each said means receiving one of said separated third fluid flows and extending a sufficient distance into one of said separated first fluid flows so as to mix an emerging separated third fluid flow essentially with only said one separated first fluid flow.

7. The divided-flow tube-in-cylinder heat transfer device of claim 6 wherein said means for dividing said third fluid flow is a tee with a leg of said tee receiving said third fluid flow and wherein said plurality of means for receiving said separated third fluid flows is tubing with one end of said tubing connected to individual arms of said tee and receiving each of said separated third fluid flows and wherein a second end of said tubing extends a sufficient distance into said separated first fluid flows so as to mix the emerging third fluid flow from said second end of said tubing essentially with only one separated first fluid flow.

8. A tube-in-cylinder heat exchanger comprising a first tube wherein said tube is divided into at least two first divided twisted fluted tubes having raised longitudinal helical crests on the exterior surface of said tubes with corresponding interior helical troughs on the interior surface of said tubes and longitudinal helical troughs adjacent to said exterior crests on said exterior surface of said tubes with corresponding interior raised helical crests on said interior surface of said tubes with each of said divided tubes formed as a set of a plurality of coils about a coil center-line in a generally annular cylindrical composite form with the coils contacting and juxtaposed one to the next and contained within an annular cylinder with the axes of said coils being coextensive with said annular cylinder center-line and through which said annular cylinder flows a fluid through voids formed by said exterior surface of said tubes and the interior annular cylinder walls, said voids existing 1) between contacting juxtaposed coils as a result of said troughs adjacent to said raises crests, said raised crests on one coil contacting the raised crests on an adjacent juxtaposed coil, 2) between said coils and said interior cylinder walls as a result of said troughs adjacent to said raised crests, said crests on said coils contacting said interior annular cylinder walls, and 3) between said coils and said interior cylinder walls as a result of the circular shape of said coil tubes, said coils in contact with each other and said interior cylinder walls, said voids allowing said fluid to flow in cross-flow 1) around and between said juxtaposed coils in said troughs and voids adjacent to said crests; 2) over said coils and between said coils and said interior cylinder walls in said troughs and voids adjacent to said cylinder-wall contacting crests, 3) between said coils and said interior cylinder walls in said voids formed as a result of the circular shape of said coil tubes in contact with each other and said interior cylinder walls, and in an overall direction generally perpendicular to said coils and parallel to said coil center-line.

9. The tube-in-cylinder heat exchanger according to claim 8 wherein said tube is divided by means of a first manifold connected to said divided tubes.

10. The tube-in-cylinder heat exchanger according to claim 8 further comprising means for recombining said divided tubes into a single tube.

11. The tube-in-cylinder heat exchanger according to claim 10 wherein said recombining means is a second manifold connected to said divided tubes.

12. The tube-in-cylinder heat exchanger according to claim 8 further comprising a means for dividing a second single tube into at least two second divided tubes and for mixing a second fluid in said second divided tubes with a first fluid in said first divided tubes.

13. The tube-in-cylinder heat exchanger according to claim 12 wherein said dividing and mixing means comprises a means to receive said second divided tubes and allow each of said second divided tubes to extend a sufficient distance into one of said first divided tubes so as to mix said second fluid therein essentially with only said first fluid in one of said first divided tubes.

14. A heating and/or cooling system comprising a heat exchanger according to claim 8.

15. The heating and/or cooling system according to claim 14 wherein a hydronic working fluid flows through said voids.

16. The heating and/or cooling system according to claim 14 wherein said tube-in-cylinder heat exchanger is used as a condenser and/or evaporator in both heating and cooling modes.

17. The heating and/or cooling system according to claim 14 wherein a first tube-in-cylinder heat exchanger according to claim 8 is used as a condenser and/or evaporator, and a second tube-in-cylinder heat exchanger according to claim 8 is used as a recuperator and/or generator and/or absorber wherein said fluted tube of said first tube-in-cylinder heat exchanger has more flutes than said fluted tube of said second tube-in-cylinder heat exchanger.

18. The heating and/or cooling system according to claim 17 wherein said fluted tube of said first tube-in-cylinder heat exchanger has 1.3 times as many flutes as said fluted tube of said second tube-in-cylinder heat exchanger.

19. The heating and/or cooling system according to claim 17 wherein said fluted tube of said first tube-in-cylinder heat exchanger has more flutes per unit length as said fluted tube of said second tube-in-cylinder heat exchanger.

20. The heating and/or cooling system according to claim 19 wherein said fluted tube of said first tube-in-cylinder heat exchanger has about three times as many flutes per unit length as said fluted tube of said second tube-in-cylinder heat exchanger.

* * * * *

UNITED STATES PATENT AND TRADEMARK OFFICE
CERTIFICATE OF CORRECTION

PATENT NO.  : 5,339,654
DATED       : August 23, 1994
INVENTOR(S) : Cook et al.

It is certified that error appears in the above-identified patent and that said Letters Patent is hereby corrected as shown below:

Column 16, line 8, "Week" should read - - Weak - -.
Column 17, line 39 (table), after "Condenser 105°F" "100°F" should read
    - - 110°F - -.
Column 17, line 40 (table), after "Absorber" "100" should read - - 110 - -.

Signed and Sealed this

Twenty-ninth Day of November, 1994

Attest:

BRUCE LEHMAN

*Attesting Officer*      *Commissioner of Patents and Trademarks*